Jan. 4, 1966 — J. R. COYLE — 3,227,198
SELF-LOCKING THREADED ELEMENT
Filed Jan. 27, 1965 — 3 Sheets-Sheet 1
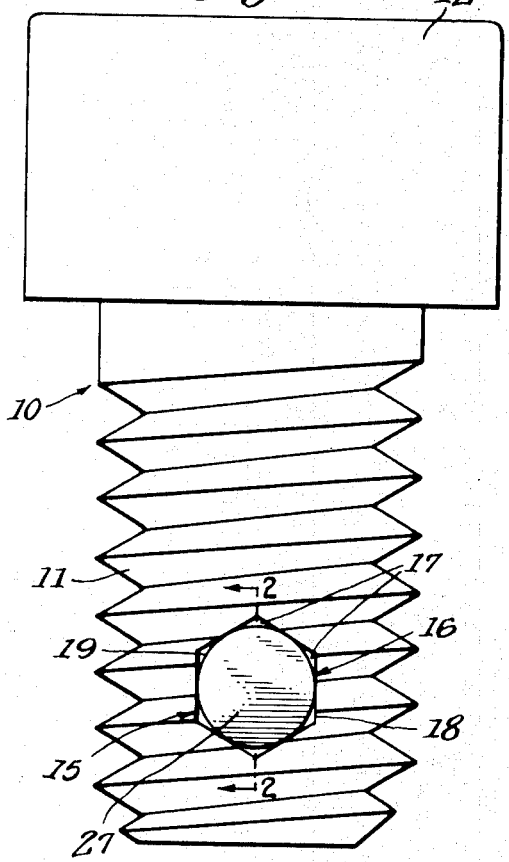
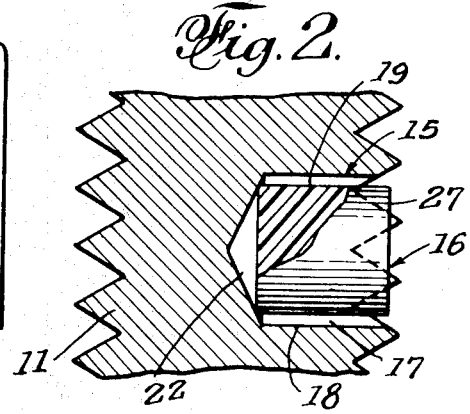
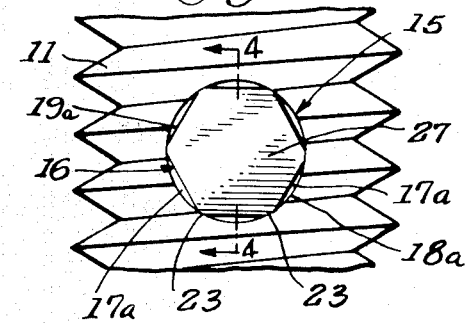
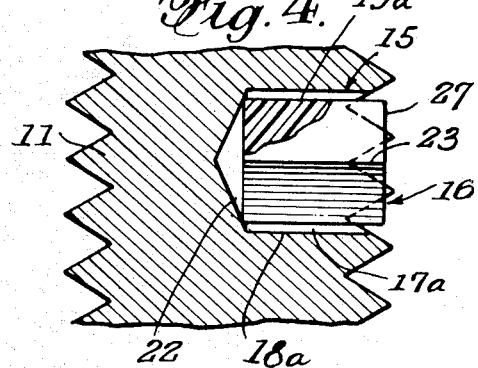
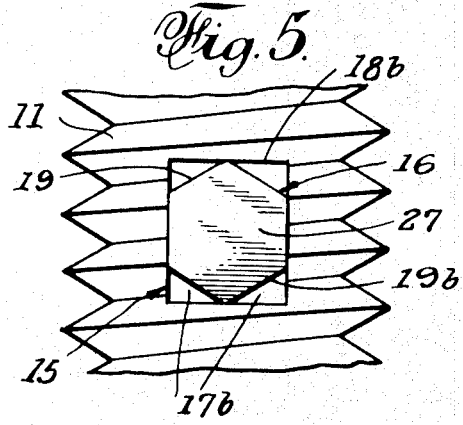
INVENTOR.
JAN R. COYLE
BY
Paul A. Weilein
ATTORNEY.

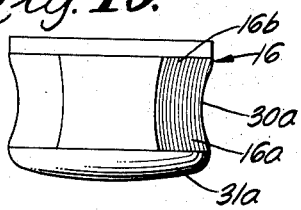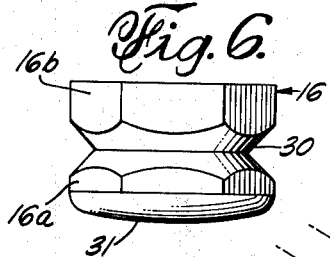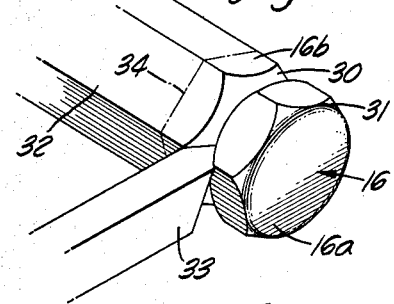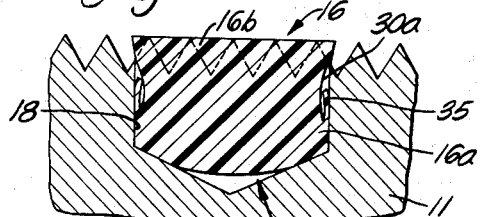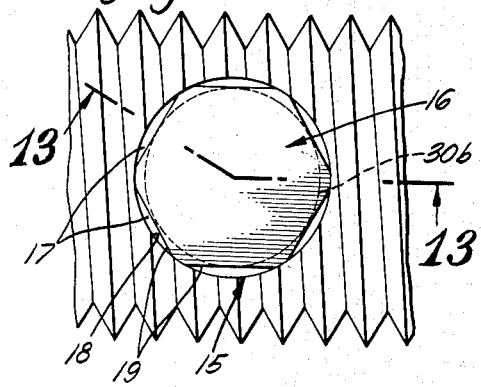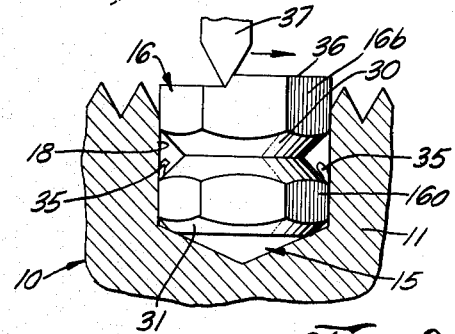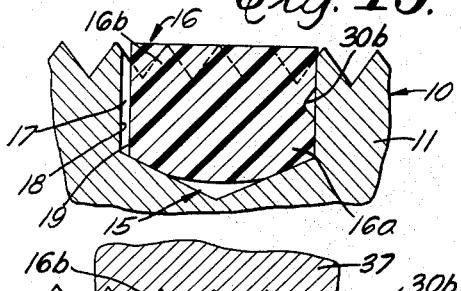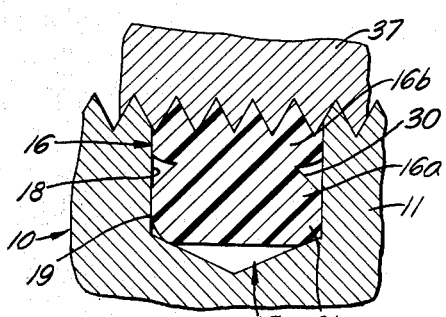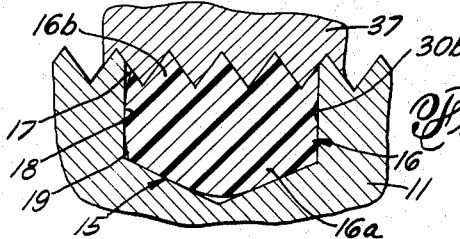

Jan. 4, 1966   J. R. COYLE   3,227,198
SELF-LOCKING THREADED ELEMENT
Filed Jan. 27, 1965   3 Sheets-Sheet 3

INVENTOR.
JAN R. COYLE
BY
Paul A. Weilein
ATTORNEY

3,227,198
SELF-LOCKING THREADED ELEMENT
Jan R. Coyle, San Dimas, Calif., assignor to Torkon Fastener Corporation, Whittier, Calif., a corporation of California
Filed Jan. 27, 1965, Ser. No. 428,291
7 Claims. (Cl. 151—7)

This application is a continuation-in-part of my pending application Serial No. 359,391 filed April 13, 1964, for Self-Locking Threaded Element, which is a continuation of application Serial No. 79,199 filed December 20, 1960, for the same invention, both of which are now abandoned.

This invention relates to a self-locking fastener element that has a threaded shank adapted to engage in a threaded seat or bore. Bolts and screws are examples of such elements. The present invention is particularly concerned with improvements that render a deformable insert, carried by the shank of such a fastener element more efficient in its self-locking engagement with the threads of a bore.

The prior art is exemplified by Svenska, British Patent No. 372,405 (1932), which discloses a threaded fastening device having a deformable locking insert or plug positioned in a through hole in the threaded portion of the fastener, but does not disclose self-locking fastener elements of the type herein claimed wherein the insert is carried in a blind seat. Brutus Patent No. 2,608,229 discloses a self-locking threaded fastening device of the type having a deformable insert positioned in a blind seat in the threaded portion of the fastener, but the insert of Brutus is of the same shape as the seat and is not solid, being provided with a central passage therethrough.

Heretofore, such deformable inserts, usually thermoplastic resin, such as nylon or other suitably elastic plastic material and, in some cases, soft metal, were so applied to the shank of a fastener element that the same could deform only in a lateral direction when engaging the complementary threads of a seat into which the shank was inserted. The primary reason for such lateral deformation was that the insert was tightly fitted into a seat provided therefor and was prevented from deforming or being displaced inwardly. Moreover, to insure that such an insert was non-displaceably fitted into its seat, the fit in the seat was made to be so tight as to cause trapping of air that, because the same would expand and contract under varying use conditions, would cause the insert to act erratically, since its frictional engagement with the seat threads would vary accordingly. Such trapped air frequently prevents proper seating of the insert in its seat. Such an insert was not only undependable in use, but the fastener element on which applied could not be re-used, especially because the lateral deformation was of such nature that the same assumed a permanent set that destroyed self-locking properties.

The present invention has for an object to provide a self-locking element of the character referred to that is free of the disadvantages above mentioned in that the same will not have trapped air behind the deformable insert, but is free to deform inwardly, i.e., both to compress radially of the fastener shank and to expand to an increased cross-sectional size as radial compression occurs. Thus, the elastic properties of the insert are not affected but remain effective to impose constant friction on the threads of the screw bore, and allow substantially full spring-back of the insert to initial form when removed for re-use in the same or another bore.

Another object of the invention is to provide a self-locking threaded element with a deformable locking insert that, initially, has a transverse or sectional form different from the form of the seat in which fitted, thereby creating air-venting passages between the insert and the wall of the seat, said passages providing spaces into which the insert is adapted to expand when the same is being subjected to deformation by engagement with the threads of a bore in which the element is fitted.

My invention also has for its objects to provide such means that are positive in operation, convenient in use, easily installed in a working position and easily disconnected therefrom, economical of manufacture, relatively simple, and of general superiority and serviceability.

Another object is to provide a self-locking threaded element having a deformable insert of a form which prevents the cutting of objectionable burrs or chips from the insert during placement of the insert in the seat therefor.

The invention also comprises novel details of construction and novel combinations and arrangements of parts, which will more fully appear in the course of the following description and which is based on the accompanying drawings. However, said drawings merely show, and the following description merely describes, preferred embodiments of the present invention, which are given by way of illustration or example only.

In the drawings, like reference characters designate similar parts in the several views.

FIGURE 1 is a side elevational view of a fastener element provided with a locking insert according to the present invention;

FIGURE 2 is a longitudinal sectional view as taken on the line 2—2 of FIGURE 1;

FIGURE 3 is a side elevational view of the shank of a fastener element, showing another form of locking insert according to the invention;

FIGURE 4 is a longitudinal sectional view as taken on the line 4—4 of FIGURE 3;

FIGURE 5 is a side elevational view, similar to FIGURE 3, of a third form of the invention;

FIGURE 6 is a detail view illustrating another form of locking insert made in accordance with the invention;

FIGURE 7 is a view diagrammatically illustrating one mode of making the locking element of FIGURE 6;

FIGURE 8 is a view illustrating the installation and finishing of the locking insert of FIGURE 6 in the seat in a threaded stem;

FIGURE 9 is a fragmentary view in longitudinal section illustrating the threaded stem of FIGURE 8 following finishing of the insert and engaged within a threaded bore;

FIGURE 10 is still another detail view showing another form of locking insert according to the invention;

FIGURE 11 is a fragmentary view in longitudinal section through a fastener stem showing the locking insert installed in the stem;

FIGURE 12 is a fragmentary elevational view illustrating still another form of locking insert installed in the threaded stem of a fastener;

FIGURE 13 is a fragmentary sectional view as taken on the line 13—13 of FIGURE 12;

FIGURE 14 is a view corresponding to FIGURE 13 but illustrating the threaded stem engaged in a threaded bore;

Figure 15:
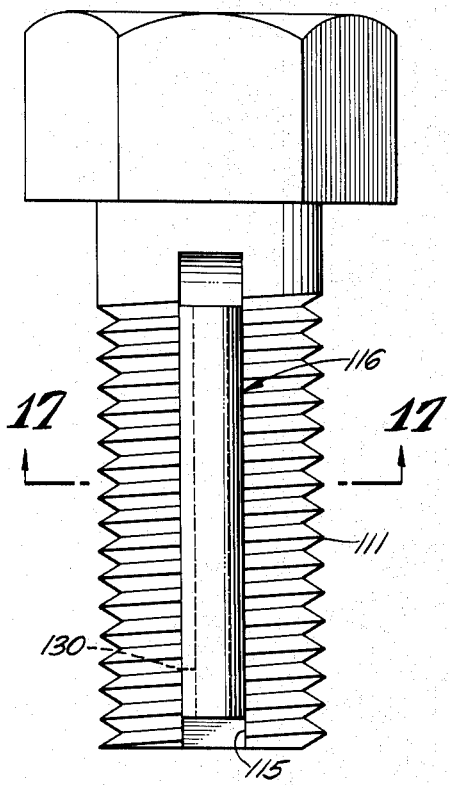
FIGURE 15 is a side elevational view of a fastener element provided with another form of locking insert according to the invention.

The present invention is shown as applied to a fastener element 10 which, essentially, comprises a threaded shank 11, and which may have a head or cap 12. The cap screw here shown is but an example of a fastener element on which the present self-locking means may be provided.

According to the present invention, the self-locking means comprises, generally, a preferably radial seat 15 provided in the shank 11 and of one transverse form, and a deformable insert 16 tightly disposed in said seat and of another transverse form, air-venting passages 17 being defined between the wall or walls 18 of the seat and the outer wall or walls 19 of the insert. The above generally describes the present improvements in the condition thereof when provided on the market preparatory to application to a threaded bore.

The present radial seat 15 is shown in FIGURE 1 as of hexagonal form; in FIGURE 3 as circular; and in FIGURE 5 as rectangular. These shapes are, of course, exemplary, since other shapes may be used, depending on the cross-sectional shape of the insert 16.

FIGURE 1 shows the insert 16 as of circular shape and of a size to tightly fit the hexagonal seat 15. Thus, the insert is not only securely fitted in place but, because the side walls 18 of the seat have tangential contact with the cylindrical wall 19 of the insert, the mentioned vent passages 17 are formed. By providing a bottom wall 22 for the seat 15, i.e., making it a blind recess, the insert may be press-fitted into said seat until the same bottoms on the wall 22. It will be clear that no air is trapped by such an engagement of the insert in the seat and that the insert is not subject to ejection forces, as may be caused by trapped air.

FIGURE 3 shows the insert as of hexagonal shape of a size so that its longitudinal corner edges 23 tightly impinge on the cylindrical wall 18a of the seat 15. Thus, air-venting passages 17a are defined between the seat wall 18a and the sides 19a of the insert. Clearly, the result is the same as in FIGURE 1, the insert being held firmly in place and no air being trapped behind the insert.

FIGURE 5 shows a hexagonal insert 16, similar to the one shown in FIGURE 3, and the sides 19b thereof and the seat sides 18b define air vent passages 17b comparable to the passages 17 and 17, above described.

Of course, the hexagonal inserts may have other polygonal shapes (octagonal, for instance), providing the shape is different from the shape of the seat so that air passages are formed in the manner described.

The insert 16 may be cut from sections of plastic rods of suitable form, as above described. If the seat 15 is cylindrical, the same may be drilled, bored or milled in the usual way, and when of polygonal shape, said seat may be broached by pilot drilling to form the side walls thereof. Flutes or grooves may also be formed by broaching.

When the shank 11 is threadedly inserted into a seat having threads complementary to the threads of said shank, the outer end face 27 of the insert, which projects beyond the root of the threads of shank 11, becomes grooved or creased by said complementary threads. Since the inserts are of the elastic plastic material previously mentioned, the grooved depressions formed in said face 27 displace portions of the insert inward in a direction toward the blind bottom 22 of the recess. If the insert had a close fit within its seat, as in prior devices, the material of the insert could not displace inwardly, because a confined elastic mass is not capable of being compressed. Hence, the undesired outer lateral spreading of the insert would occur in areas where the threads of the shank and screw seat are engaged. The result is a mutilation of the insert that impairs its locking properties and destroys its potential for re-use. In the present case, however, the passages 17, 17a and 17b afford spaces into which the inserts may swell out as the same are compressed by the threads of the screw seat. Full elasticity of the insert is retained so that the same is, at all times, effective to create the self-locking forces that are a feature of the present device. Upon removal of the fastener, the insert will largely resume its initial shape and be ready for re-use.

An important advantage derived from the present invention resides in the fact that not only does the insert resume its initial shape so as to be ready for re-use, and not only do the air spaces described above permit of adequate deformation of the locking insert without causing mutilation of the outer portion thereof as described above, but the further benefit derives from the present invention that the insert, in not being fully compacted within the cavity upon installation of the threaded fastener and by not being mutilated, is availed of to produce a continuing force lateral to the axis of the mating threads to maintain the locked condition between the threads. These factors contribute to the production of a fastener which has a superior locking effect, which locking effect is maintained through repeated removals and insertions of the threaded fastener. In actual test insertions and removals of a threaded bolt made in accordance with the present invention, and more particularly wherein the invention was in the form illustrated in FIGURES 3 and 4 and was of the standard size ¼–28, or ¼" in diameter with 28 threads per inch, it was observed by inserting and removing five sample fasteners fifteen times each, that adequate torque characteristics were maintained through the fifteenth installation. The results of this test are shown in the following Table A.

TABLE A

*Sample Identification: Size ¼–28*

| Installation Number | 1 | | 2 | | 3 | | 4 | | 5 | |
|---|---|---|---|---|---|---|---|---|---|---|
| | I | R | I | R | I | R | I | R | I | R |
| 1 | 15 | 15 | 15 | 15 | 20 | 22 | 12 | 10 | 10 | 10 |
| 2 | 11 | 12 | 12 | 14 | 12 | 15 | 8 | 8 | 9 | 9 |
| 3 | 10 | 10 | 11 | 11 | 9 | 9 | 6 | 7 | 7 | 7 |
| 4 | 9 | 9 | 10 | 10 | 8 | 9 | 6 | 7 | 5 | 5 |
| 5 | 10 | 10 | 9 | 9 | 7 | 7 | 6 | 7 | 5 | 5 |
| 6 | 9 | 9 | 8 | 8 | 6 | 6 | 6 | 6 | 4 | 4 |
| 7 | 9 | 9 | 7 | 7 | 6 | 7 | 6 | 6 | 4 | 3.5 |
| 8 | 8 | 8 | 7 | 7 | 6 | 7 | 6 | 6 | 3.5 | 3.5 |
| 9 | 8 | 8 | 7 | 7 | 6 | 6 | 5 | 5 | 3.5 | 3.5 |
| 10 | 8 | 9 | 7 | 7 | 5 | 6 | 5 | 5 | 3.5 | 3.5 |
| 11 | 8 | 9 | 7 | 7 | 4 | 5 | 4 | 5 | 3.5 | 4 |
| 12 | 8 | 8 | 7 | 6 | 4 | 5 | 5 | 5 | 3.5 | 3.5 |
| 13 | 8 | 8 | 7 | 6 | 4 | 4 | 4 | 5 | 3.5 | 3.5 |
| 14 | 8 | 8 | 6 | 6 | 4 | 4 | 4 | 5 | 3.5 | 3.5 |
| 15 | 8 | 8 | 6 | 6 | 4 | 4 | 4 | 5 | 3.5 | 3.5 |

Referring to sample No. 1 as shown in the table, it will be noted that initial installation torque designated I is recorded at 15 inch pounds, while the initial removal or break-away torque designated R is also 15 inch pounds. As the bolt was repeatedly removed and inserted through fifteen installations and removals, it is observed that the torque characteristic both as to installation and removal gradually decreased through six installations and removals, but then remained substantially constant. The same observation may be made in respect of each of samples 2 through 5. The minimum torque characteristics of the sample fasteners of Table A significantly exceeds the minimum military specifications for this type of self-locking bolt.

In another instance, the superiority of the locking fastener of the present invention over another self-locking bolt having a nylon insert absent the air or deformation spaces of the present invention was established by actual comparative testing as recorded in the following Table B.

TABLE B

*Sample Identification: Size 3–48*

| Installation No. | A | | B | | C | | D | | E | | 1 | | 2 | |
|---|---|---|---|---|---|---|---|---|---|---|---|---|---|---|
| | I | R | I | R | I | R | I | R | I | R | I | R | I | R |
| 1 | 10 | 5 | 10 | 5 | 12 | 12 | 18 | 12 | 15 | 15 | 10 | 9 | 10 | 8 |
| 2 | 6 | 6 | 6 | 6 | 9 | 6 | 7 | 7 | 5 | 6 | 4 | 4 | 8 | 9 |
| 3 | 6 | 6 | 6 | 6 | 8 | 6 | 6 | 6 | 2 | 2 | 4 | 4 | 8 | 8 |
| 4 | 6 | 4 | 5 | 6 | 6 | 6 | 5 | 5 | 2.5 | 3 | 4 | 4 | 8 | 9 |
| 5 | 2 | 1.5 | 1.5 | 2 | 6 | 2 | 5 | 4 | 2.5 | 3 | 3.5 | 4 | 6 | 9 |
| 6 | 1.5 | 1.5 | 1.5 | 1.5 | 4 | 3 | 4 | 4 | 2 | 2.5 | 4 | 4 | 8 | 9 |
| 7 | 1.5 | 1.5 | 1.5 | 1.5 | 4 | 2 | 2 | 3 | 2.5 | 3 | 4 | 4 | 8 | 8 |
| 8 | 1 | 1.5 | 1 | 1.5 | 4 | 1.5 | 2 | 3 | 2.5 | 3 | 3.5 | 3.5 | 8 | 9 |
| 9 | 1 | 1.5 | 1 | 1.5 | 4 | 3 | 2 | 3.5 | 2.5 | 2.5 | 3.5 | 4 | 8 | 8 |
| 10 | 1 | 1.5 | 1 | 1.5 | 3 | 3 | 2 | 2.5 | 2 | 2.5 | 3 | 3.5 | 7 | 8 |
| 11 | 1 | 1.5 | 1 | 1.5 | 3 | 3.5 | 1.5 | 2 | 2 | 3 | 3.5 | 4 | 7 | 8 |
| 12 | 1 | 1.5 | 1 | 1.5 | 3 | 3.5 | 1.5 | 2 | 2 | 2 | 3 | 4 | 7 | 8 |
| 13 | 0.5 | 1.5 | 1 | 1.5 | 3.5 | 3.5 | 1.5 | 2 | 2 | 2.5 | 3.5 | 3.5 | 7 | 8 |
| 14 | 0.5 | 1.5 | 1 | 1.5 | 3.5 | 3.5 | 1.5 | 2 | 2 | 2 | 3.5 | 3.5 | 7 | 8 |
| 15 | 0.5 | 1.5 | 1 | 1.5 | 3 | 3 | 1.5 | 2 | 2 | 2 | 3.5 | 4 | 7 | 8 |

In Table B, the samples identified A through E, inclusive, are prior art locking bolts commercially available and comprising a nylon insert extending longitudinally of and filling a corresponding cavity formed in the side of a threaded stem, while samples identified as Nos. 1 and 2 were each fasteners made in accordance with the present invention, and more particularly, in accordance with the disclosure of FIGURES 3 and 4, as was the case with the samples of Table A. All of the sample fasteners of Table B were of the standard size 3–48, which is .099" with 48 threads per inch, and torque was measured in inch ounces. As in the case of Table A, all of the sample fasteners, both of the prior art type and of the type embodying the present invention, exhibited insertion and removal torque characteristics which declined to a leveling off point. It will be appreciated further from Table B that the torque characteristics of specimens 1 and 2 made in accordance with the invention are constantly higher than the specimens A through E. In the case that the minimum removal torque requirement is 3 inch ounces, only samples 1 and 2 throughout the entire fifteen insertions and removals retained 100% or better efficiency throughout the entire test.

The superior characteristics of fasteners made in accordance with the invention may be directly ascribed to the relationship of the locking insert configuration and volume to the recess in which the locking insert is installed, this relationship being one which, due to the provision of air spaces into which insert material may flow during driving of the fastener, the insert is not wholly confined by the surrounding walls and thread of the complementally threaded member and, therefore, the insert is not adversely mutilated during driving of the fastener nor fully and permanently rendered incapable of exerting a force lateral to the axis of the fastener.

In FIGURE 6, there is shown a modified insert of hexagonal shape adapted to fit within a circular recess in the threaded fastener stem as in the case of the embodiment shown in FIGURES 3 and 4. The insert 16 of FIGURE 6 has between its ends an annular depression 30 which affords advantages in respect of installation of the insert in the seat of a threaded fastener stem as well as the provision of additional space into which the elastic insert material may flow when subjected to deforming forces.

In addition, the insert of FIGURE 6 is provided at its end which is to be innermost in the seat with a bevelled surface 31 so that the insert effectively has a rounded head for insertion into the seat. The insert of FIGURE 6 may be easily formed, for example, from a length of hexagonal nylon rod or other similar material. Such a rod is designated 32 in FIGURE 7 and may be engaged by a cutter 33 as the hexagonal stock 32 is rotated, so as to cut the annular depression 30 and so as to provide the bevelled surfaces 31. An insert of a desired length may be then cut from the hexagonal stock as, for example, on the broken line 34. Such insert has at one side of depression 30 an end section 16a having the bevelled surfaces 31, this section 16a being the lead end of the insert or inner end when installed in a seat 15, and at the other side of the depression 30 is the outer end section 16b.

In regard to the advantage resulting from the annular depression 30 in the installation of the insert 16 into the seat 15 of the threaded stem or shank 11 of the fastener as seen in FIGURE 8, it will be noted that this annular depression interrupts the continuity of the seat wall opposing portions of the insert and provides a chamber into which burrs or cuttings 35 removed from the entering end section 16a of the insert upon forcing of the latter into the seat 15. Hence, the burrs or cuttings 35 are not present at the outer end section 16b of the insert.

Preferably, the insert is cut from the hexagonal stock so as to have a length greater than the depth of the seat 15 so that there will remain a residual outward projection 36 following insertion of the insert which may be removed and shaped to the contour of the thread crests as by a cutter 37 after the insert has been installed. It will also be appreciated that the frictional resistance to installation of the insert as described in connection with FIGURES 6 through 8, is reduced by virtue of the depression 30 as well as by virtue of the fact that the insert is provided with essentially a rounded entrance head by the formation of the bevelled surfaces 31.

The annular depression 30 not only provides a chip or cutting chamber for reception of the burrs or cuttings 35, but also, as shown in FIGURE 9, affords additional space in the seat 15 into which the deformable elastic insert material may flow when deformed by the mating thread of the threaded member 37 into which the fastener stem 11 is driven. The deformation of the insert occurs principally in the outer end section 16b of the insert in the embodiment now being described, and the annular depression 30 therefore assures adequate open space for reception of the material with the result that the resilient biasing effect of the insert is retained so as to maintain a lateral force acting between the threaded members 37 and 11 to assure a locking action. Moreover, the depression 30 further assures that the insert will not be mutilated during installation of the fastener stem 11 in the threaded member 37 as occurs in the case of the prior art devices in which inadequate space is available for accommodating the flow of the insert.

An insert 16 having the structural characteristics of that shown in FIGURE 6 may be made in other manners than that described above and shown in FIGURES 7 and 8. An example of another such insert is shown in FIGURE 10 wherein the annular depression is designated 30a and the rounded head is designated 31a. The annular depression 30a is such that the hexagonal section of the insert 16 is retained even at the base of the depression, but structurally and functionally the depression 30a serves the same purposes as the depression 30 in the insert of FIGURE 6 and the rounded head 31 has the same essential structure and function as the rounded head of the insert of FIGURE 6 provided by the bevelled surfaces 31. As shown in FIGURE 11, the depression 30a of the insert 16 of FIGURE 10 divides the insert to provide spaced entering and outer ends 16a and 16b, respectively, and affords a chamber for receiving the cuttings or burrs 35 just as in the case of the embodiment of FIGURE 6.

In the production of the insert of FIG. 10, the outer surface of the outer end section 16b of the insert may be formed on a curvature substantially corresponding to the diameter of the thread crests of the threaded stem 11 so that upon insertion of the insert in the seat 15, no further cleaning, forming, or deburring operation will be required.

Referring now to FIGURES 12–14, a further modification of the invention is shown wherein the insert 16 is formed with an annular depression 30b which extends inwardly only at the insert ridges or corners which contact the wall of the seat. In such a construction, the annular cavity has a minor diameter such that it is more or less tangent to the flat surfaces on the insert which define the spaces between the insert and the seat, whereby to accommodate insert deformation. However, the advantages of the annularly recessed structure described with respect to FIGURES 6 and 10 are also availed of in the insert of FIGURES 12–14, since clearly the cutting of material from the entering end 16a of the insert as the same is being forced into the seat occurs at the seat wall contacting ridges and not in the region of the intervening portions of the insert which are spaced from the seat wall. Yet, the annular depression 30b in the region of the seat wall contacting ridges affords a space into which the material in the ridges may flow when the threaded stem 11 of the fastener of FIGURES 12–14 is installed in the bore of a complemental member 37, as shown in FIGURE 14.

Figure 17:
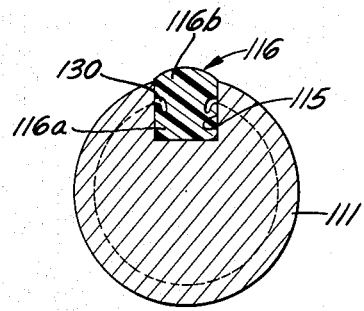
FIGURE 17 is a view in transverse section as taken on the line 17—17 of FIGURE 15.
Figure 16:
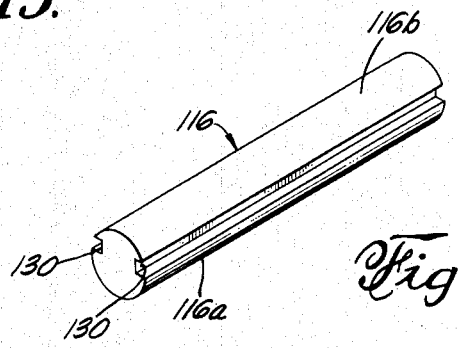
FIGURE 16 is a view in perspective illustrating the insert of FIGURE 15.

Referring to FIGURES 15–17, there is illustrated a locking fastener having a deformable insert extending lengthwise of the threaded stem, this in general being a well-known form of locking fastener. However, in accordance with the present invention, the locking insert designated 116 is, as seen in FIGURE 16, preferably formed from a cylindrical rod of nylon or similar deformable material. The seat designated 115 formed in the threaded stem 111 is typically illustrated as consisting of an elongated slot leading axially of the threaded stem from its lead end, the seat being generally rectangular in cross-section, opening radial to the fastener stem and being blind in the sense that it has a bottom wall. It is the current practice in the production of the prior devices of the type general shown in FIGURES 15–17 to force a circular nylon rod section into the rectangular slot, leaving the protruding portion of the rod lying outward of the thread crests and effectively causing interference of the material in the complemental threads when the fastener is driven.

In accordance with the present invention, the elongated cylindrical insert 116 is provided along its sides with elongate chambers 130 which constitute chambers for receiving cuttings or burrs removed from the entering end section 116a of the insert 116 as it is forced past the edges of the interrupted threads at the side walls of the seat 15. Moreover, in this embodiment it will be recognized upon reference to FIGURE 17 that the elongated cutting chambers 130 afford expansion space into which the insert material may flow when subjected to radial deforming forces. The outer end section 116b of insert 116 provides a clean, burr-free projection which may, as illustrated best in FIGURE 17, have an arcuate surface on a small radius projecting outwardly beyond the thread crest diameter, preferably in order to provide a structure in which the inner end section 116a tightly fits within the seat 116a, and the outer section 116b is more free to be deformed. The grooves forming the chambers 130 are formed on opposite marginal walls of the insert 116 on a chordal plane spaced outwardly from a diametrical line across the insert and parallel to the base of the seat when the insert is installed.

From the foregoing, it will now be apparent that the present invention provides, as disclosed in FIGURES 1–5, a relationship between the deformable locking insert and the seat for the insert whereby contact occurs between the seat wall and the locking element at spaced ridges, there being intervening spaces between the ridges so that material flow may occur when the insert is deformed by the threads of a member with which the insert carrying member is engaged. As to the embodiment of the insert as generally disclosed in FIGURES 6, 10, and 12, it will be apparent that these inserts are the same kind of insert as that disclosed in FIGURES 1–5, but modified or improved in terms of ease of installation in the seats therefor and in terms of freedom from burrs or cuttings which might otherwise interfere with the complemental threads upon driving or removal of the fastening device of the present invention, as well as in terms of provision of still additional space into which the insert material may flow. Furthermore, it will be noted that the insert 116 of FIGURE 16 employs the feature of the inserts of FIGURES 6, 10, and 12 as regards ease of insertion without formation of burrs protruding into the region of the threads on the stem.

The present invention is not limited to the precise details of the various inserts above disclosed, since other specific insert shapes might be employed within the purview of the teachings of the present invention and within the scope of the appended claims. The insert may have longitudinal flutes or grooves and be used in connection with a cylindrical seat, or the reverse may be employed, i.e., a cylindrical or a cylindrical but centrally depressed insert in a seat having a longitudinally grooved wall, the important structural aspect of the present invention being the provision of the spaces which intervene between the angularly spaced portions of the insert which contact the wall of the bore and the chamber for receiving cuttings.

I claim:

1. A self-locking threaded element having a threaded shank, said element having in said threaded shank a blind radial seat with a bottom wall and an insert of deformable elastic material tightly fitting said seat and having an outer end section disposed outwardly of the root of the threads of the shank and an inner end section engaged with said bottom wall, said seat being circular in cross-section and said insert being polygonal in cross-section, providing angularly spaced corners on the sides of said insert engaged with the side wall of said seat at angularly spaced locations, and intervening expansion spaces between said corners into which the material is free to expand upon endwise deformation of said insert, and said insert having a depression between said end sections of said insert extending circumferentially of said insert in at least said corners to provide additional expansion space for said insert material and to form a chamber interrupting the continuity of at least said corners.

2. A self-locking threaded element as defined in claim 1, wherein said depression is a continuous depression also extending into the insert in the region between said corners of said insert.

3. A self-locking threaded element as defined in claim 1, wherein said depression is annular and has a diameter tangent to the sides of said insert between said corners.

4. A self-locking threaded element as defined in claim 1, wherein said depression is a continuous depression also extending into the insert in the region between said corners of said insert, said insert also having a polygonal cross-section in said depression.

5. A self-locking threaded element having a threaded shank, said element having in said threaded shank a blind radial seat extended longitudinally of said threaded shank and provided with a bottom wall, and an insert of deformable elastic material extended longitudinally in said seat and tightly fitting the side walls of said seat, said insert having an outer end section disposed outwardly of the root of the threads and at least substantially to the crests of said threads of the shank and an inner end section engaged with said bottom wall, said insert also having a marginal depression on each of its opposite longitudinal sides and extended longitudinally between said end sections of said insert providing expansion space for said insert material and forming a cutting-receiving chamber interrupting the continuity of the marginal wall of said insert, the volume of said seat unfilled by said insert being greater than the volume of the insert material displaced by the threads of a complementally threaded member when said element is threaded in a threaded bore in said member.

6. A self-locking threaded element as defined in claim 5, in which said depressions in the opposite sides of said insert extended longitudinally of said insert on a plane spaced outwardly from a diametrical line across said insert.

7. A self-locking threaded element having a threaded shank, said element having in said threaded shank a blind radial seat with a generally cylindrical side wall and a conical bottom wall, a solid insert of deformable elastic material of generally polygonal cross section and having at least five sides disposed in said seat and having a plurality of longitudinally extended corner edges each tightly fitting with said side wall, the inner end of said insert having corners at the juncture of said edges with the inner end of said insert, said corners being engaged with said conical wall in angularly spaced relation, whereby spaces are formed around said insert and between the inner end of said insert and said conical wall into which the insert expands upon endwise compression of said insert, said spaces defining venting channels for air displaced between said conical wall and said inner end of the insert during insertion of the insert into the seat and during deformation of said insert, the tight fit of said edges of said insert with said side wall and the area of contact therebetween being sufficient to prevent longitudinal outward displacement of said insert from said seat but permitting inward displacement of said insert upon the application of endwise compressive forces thereto by the threads of a complementally threaded member in which said threaded shank is disposed, the outer end of said insert projecting outwardly beyond the root of said threads and at least substantially to the crests of said threads, and the volume of said seat unfilled by said insert being greater than the volume of the insert material displaced by the threads of the complementally threaded member.

References Cited by the Examiner

UNITED STATES PATENTS

| 752,669 | 2/1904 | Guzowski | 151—7 |
| 2,087,185 | 7/1937 | Dillon | 151—7 |
| 2,608,229 | 8/1952 | Brutus | 151—7 |
| 2,913,031 | 11/1959 | McKay et al. | 151—7 |

FOREIGN PATENTS

| 964,862 | 2/1950 | France. |
| 372,405 | 5/1932 | Great Britain. |

CARL W. TOMLIN, *Primary Examiner.*

EDWARD C. ALLEN, *Examiner.*